US011216332B2

United States Patent
Jang et al.

(10) Patent No.: US 11,216,332 B2
(45) Date of Patent: Jan. 4, 2022

(54) MEMORY CONTROLLER AND METHOD OF OPERATING THE SAME

(71) Applicant: SK hynix Inc., Gyeonggi-do (KR)

(72) Inventors: Jae Youn Jang, Gyeonggi-do (KR); Jeong Su Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/944,996

(22) Filed: Jul. 31, 2020

(65) Prior Publication Data
US 2021/0279127 A1     Sep. 9, 2021

(30) Foreign Application Priority Data
Mar. 3, 2020   (KR) .......................... 10-2020-0026650

(51) Int. Cl.
*G06F 11/00* (2006.01)
*G06F 11/10* (2006.01)

(52) U.S. Cl.
CPC ...... *G06F 11/1004* (2013.01); *G06F 11/1076* (2013.01)

(58) Field of Classification Search
None
See application file for complete search history.

(56) References Cited

U.S. PATENT DOCUMENTS

| | | | | |
|---|---|---|---|---|
| 2004/0168101 A1* | 8/2004 | Kubo | .................... | G06F 11/108 714/6.12 |
| 2011/0191649 A1* | 8/2011 | Lim | ........................ | G06F 11/10 714/752 |
| 2015/0154075 A1* | 6/2015 | Sugimoto | ........... | G06F 11/1092 714/6.24 |
| 2020/0210282 A1* | 7/2020 | Cariello | ................ | G06F 3/0679 |
| 2020/0218606 A1* | 7/2020 | Ji | ......................... | G11C 11/5642 |

FOREIGN PATENT DOCUMENTS

| | | |
|---|---|---|
| KR | 10-2010-0075891 | 7/2010 |
| KR | 10-2019-0043860 | 4/2019 |

OTHER PUBLICATIONS

S. Im and D. Shin, "Delayed partial parity scheme for reliable and high-performance flash memory SSD," 2010 IEEE 26th Symposium on Mass Storage Systems and Technologies (MSST), 2010, pp. 1-6, doi: 10.1109/MSST.2010.5496997. (Year: 2010).*

* cited by examiner

Primary Examiner — Daniel F. McMahon
(74) Attorney, Agent, or Firm — IP & T Group LLP

(57) ABSTRACT

A memory controller controlling an operation of a memory device includes a parity module configured to perform one or more exclusive OR operations using data to be stored in the memory device and generate parity according to the one or more exclusive OR operations, and a recovery controller configured to control the parity module to store the parity in the memory device based on the number of times the exclusive OR operation is performed.

20 Claims, 12 Drawing Sheets

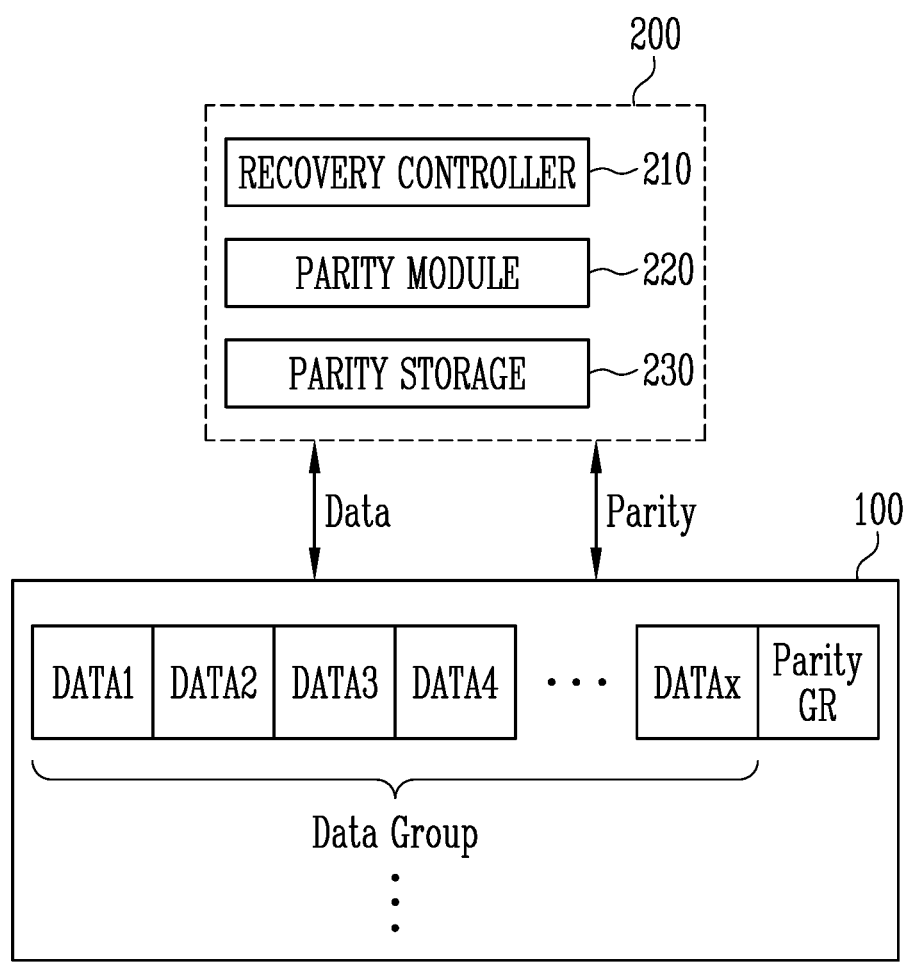

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0026650, filed on Mar. 3, 2020, which is incorporated herein by reference in its entirety.

BACKGROUND

1. Field of Invention

The present disclosure relates to an electronic device, and more particularly, to a memory controller and a method of operating the same.

2. Description of Related Art

A storage device stores data. A storage device includes a memory device in which data is stored and a memory controller controlling the memory device. A memory device is implemented using a semiconductor such as silicon (Si), germanium (Ge), gallium arsenide (GaAs), or indium phosphide (InP). A memory device may be a volatile memory device or a non-volatile memory device.

In a volatile memory device stored data is lost when its power supply is cut off. Examples of volatile memory devices include a static RAM (SRAM), a dynamic RAM (DRAM), a synchronous DRAM (SDRAM), and the like.

A non-volatile memory device retains stored data even though its power supply is cut off. Examples of non-volatile memory devices include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. A flash memory may be of a NOR type or a NAND type.

The memory device may include parity that recovers data when an error occurs in read data.

SUMMARY

An embodiment of the present disclosure provides a memory controller having improved performance and a method of operating the same.

A memory controller according to an embodiment of the present disclosure controls an operation of a memory device. The memory controller includes a parity module configured to perform one or more exclusive OR operations using data to be stored in the memory device and generate parity according to the one or more exclusive OR operations, and a recovery controller configured to control the parity module to store the parity in the memory device based on the number of times the exclusive OR operation is performed.

A memory controller according to an embodiment of the present disclosure controls an operation of a memory device. The memory controller includes a parity module configured to perform an exclusive OR operation a threshold number of times using data to be stored in the memory device, and to generate parity according to the exclusive OR operations, and a recovery controller configured to control the parity module to store the parity in the memory device before storage of the data is completed.

A storage device according to an embodiment of the present disclosure includes a memory device including a plurality of memory cells, and a memory controller configured to perform an exclusive OR operation at least once using data to be stored in the memory device, and provide parity generated according to the exclusive OR operation to the memory device based on the number of times the exclusive OR operation has been performed.

An operating method of a memory controller according to an embodiment of the present disclosure includes performing a bitwise XOR operation between a current data unit of a group of data units and a previous sub-parity unit to generate a current sub-parity unit, iterating the performing on each of the other data units in the group while buffering the group, controlling, upon completion of the iterating, a memory device to store the current sub-parity unit in a parity region, and controlling, after the storing of the current sub-parity unit, the memory device to store the buffered group in a data region.

According to an embodiment of the present technology, a data recovery function of a memory system may be improved.

BRIEF DESCRIPTION OF THE DRAWINGS

FIG. 2C is a diagram illustrating an operation in which data chunks and the parity are stored in the memory device.

DETAILED DESCRIPTION

Figure 1:
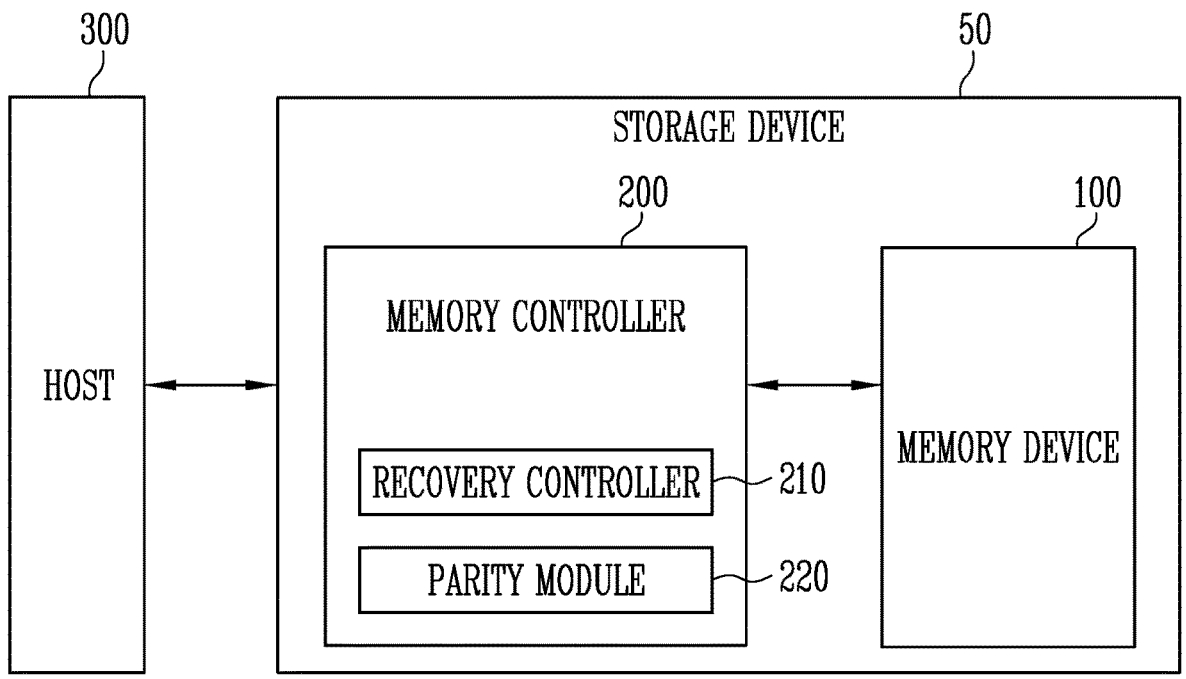
FIG. 1 is a block diagram illustrating a storage device according to an embodiment of the present disclosure.

FIG. 1 is a block diagram illustrating a storage device according to an embodiment of the present disclosure.

Referring to FIG. 1, the storage device 50 may include a memory device 100 and a memory controller 200 that controls an operation of the memory device.

The storage device 50 may store data under control of a host 300 such as a cellular phone, a smartphone, an MP3 player, a laptop computer, a desktop computer, a game player, a TV, a tablet PC, or an in-vehicle infotainment system.

The storage device 50 may be configured as any of various types of storage devices according to a host interface that sets a communication protocol with the host 300. For example, the storage device 50 may be configured as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and/or a memory stick.

The storage device 50 may be manufactured as any of various types of packages. For example, the storage device 50 may be manufactured as a package on package (POP), a system in package (SIP), a system on chip (SOC), a multichip package (MCP), a chip on board (COB), a wafer-level fabricated package (WFP), and/or a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, by way of example, features and aspects of the present invention are described in the context in which the memory device 100 is a NAND flash memory.

The memory device 100 may receive a command and an address from the memory controller 200. The memory device 100 is configured to access an area selected by the received address of the memory cell array. Accessing the selected area means performing an operation corresponding to the received command on the selected area. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls overall operation of the storage device 50.

When power is applied to the storage device 50, the memory controller 200 may execute firmware (FW). The firmware FW may include a host interface layer HIL that receives a request input from the host 300 or outputs a response to the host 300, a flash translation layer (FTL) that manages an operation between an interface of the host 300 and an interface of the memory device 100, and a flash interface layer (FIL) that provides a command to the memory device 100 or receive the response from the memory device 100.

In an embodiment, the memory controller 200 may receive data and a logical address (LA) from the host 300, and may convert a logical block address into a physical address (PA) indicating an address of memory cells in which data in the memory device 100 is to be stored. The LA may be a logical block address (LBA), and the PA may be a physical block address (PBA).

The memory controller 200 may control the memory device 100 to perform a program operation, a read operation, or an erase operation according to an associated request of the host 300. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

Referring to FIG. 1, the memory controller 200 may further include a recovery controller 210 and a parity module 220.

Various methods may be used to increase reliability of data stored in the memory device 100. The memory controller 200 according to an embodiment may perform a data recovery operation. The data recovery operation may be an operation of recovering data when an error occurs as a result of reading the data. Specifically, the memory device 100 may include a plurality of memory chips. Data stored in the plurality of memory chips may be grouped into multiple data groups, and parity for each group may be generated and stored in the memory device 100. When an error occurs during a read operation of data belonging to a specific group among the data groups, the data in which the error occurs may be recovered again using parity information of the corresponding data group. That is, the parity may include information used to recover data. More specific method is described below with reference to drawings.

The recovery controller 210 may control a time at which the parity generated by the parity module 220 is stored in the memory device 100. For example, the recovery controller 210 may determine the time at which the parity is provided to the memory device 100, based on the number of times an operation on data performed by the parity module 220. That is, according to an embodiment of the recovery controller 210, before an operation in which data is stored in the memory device 100 is completed, the parity for that data may be provided and stored in the memory device 100 in advance. That is, the parity already generated by the parity module 220 may be stored in the memory device 100 without waiting for the data itself to be stored in the memory device 100. The parity according to an embodiment may be stored in the memory device 100 faster or sooner than when parity is stored in the memory device 100 after the storage of the data in the memory device 100 is completed. Therefore, reliability of the data and operation efficiency may be improved. The data may include a plurality of data chunks. A data chunk may be a unit of data on which an exclusive OR operation is performed according to an embodiment of the present disclosure. For example, an error correction code (ECC) operation may be performed in data chunk units.

In an embodiment, the memory controller 200 may control the memory device 100 to perform a program operation, a read operation, or an erase operation by itself in the absence of a corresponding request from the host 300. For example, the memory controller 200 may control the memory device 100 to perform a program, read or erase operation to perform a background operation such as wear leveling, garbage collection, or read reclaim.

The host 300 may communicate with the storage device 50 using at least one of various communication methods/protocols such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and/or a load reduced DIMM (LRDIMM).

Figure 2A:
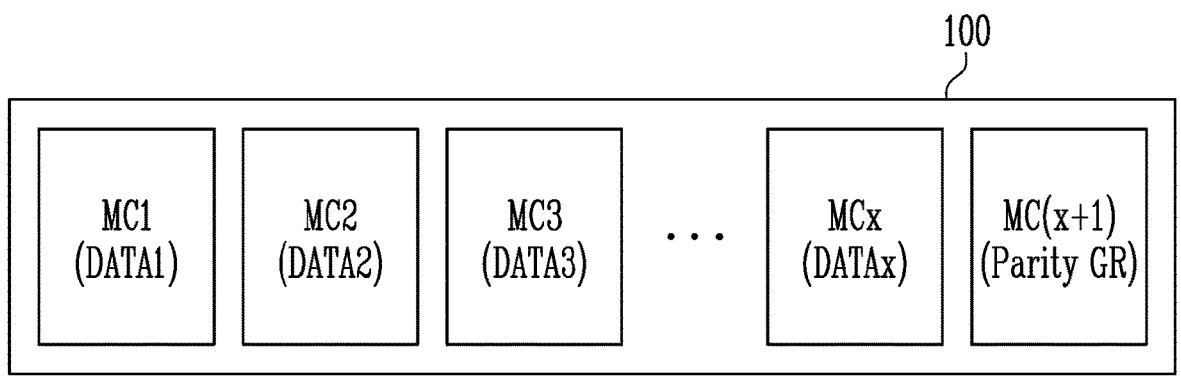
FIG. 2A is a diagram illustrating an aspect of a memory device.
Figure 2B:
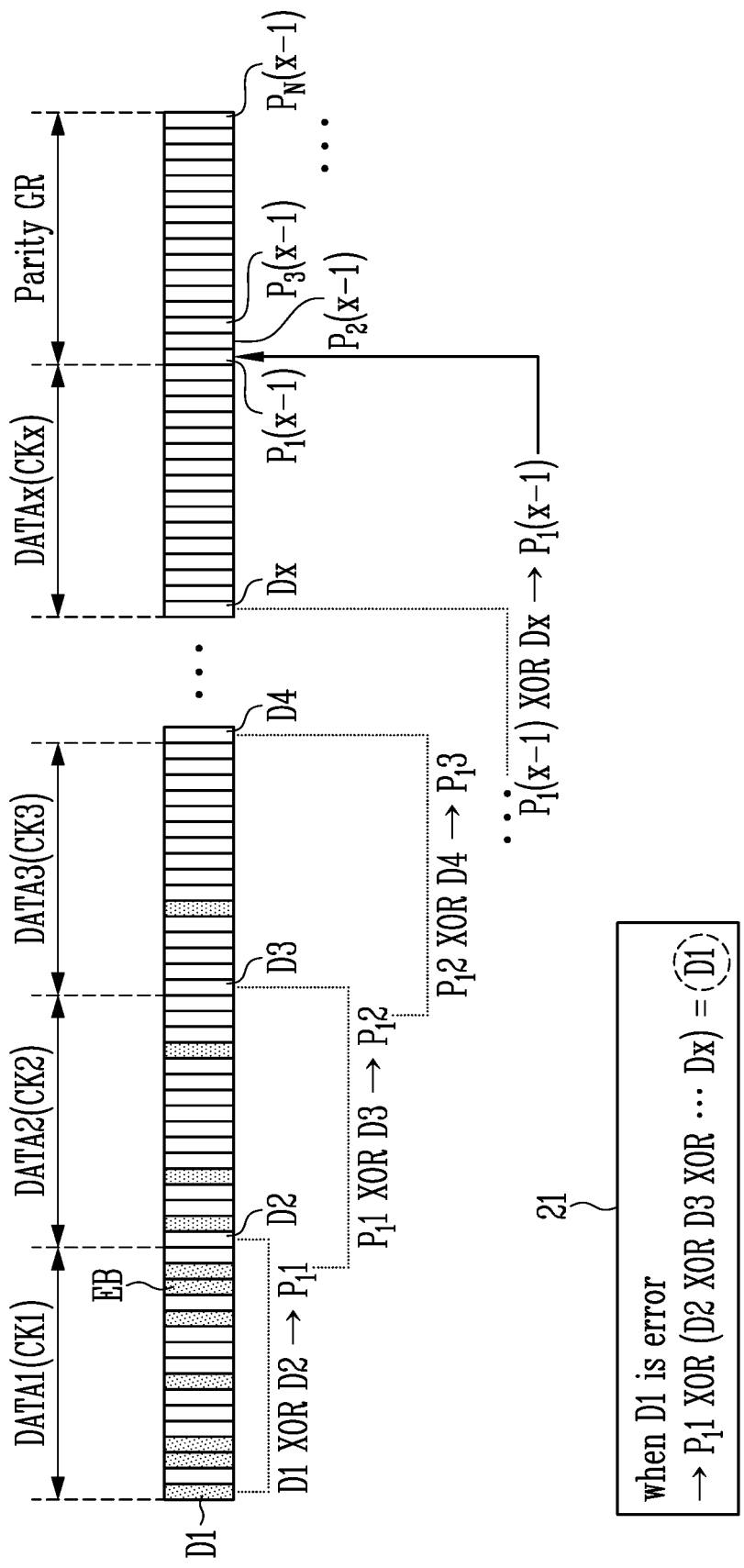
FIG. 2B is a diagram illustrating a method of recovering data using parity.

FIG. 2A is a diagram illustrating an aspect of the memory device, FIG. 2B is a diagram illustrating a method of recovering data using the parity, and FIG. 2C is a diagram illustrating an operation in which the data chunks and the parity are stored in the memory device.

Referring to FIG. 2A, the memory device 100 may include a plurality of memory chips MC1 to MC(x+1) (x is a positive integer). The plurality of memory chips MC1 to MC(x+1) may store data, and at least one memory chip, e.g., MC(x+1), may be configured to store parity for error correction of data stored in other memory chips. For example, the first to x-th memory chips MC1 to MCx may store user data, and the (x+1)-th memory chip MC(x+1) may store the parity. The parity stored in the memory chip MC(x+1) may be a parity group Parity GR obtained by performing a sequence of XOR operations on first to x-th data chunks DATA1 to DATAx stored in the first to x-th memory chips MC1 to MCx. The first to x-th data chunks DATA1 to DATAx may be a chunk unit of data in the first to x-th memory chips MC1 to MCx, respectively, or may be data divided into a chunk unit in the same memory chip. In the following embodiment, a method of managing data divided in chunk units and stored in different memory chips, respectively, is described, but the present invention is not limited thereto.

A method of generating the parity by applying logical operations on data selected from the first to x-th data chunks DATA1 to DATAx and recovering error bits generated in the first to x-th data chunks DATA1 to DATAx is described as follows.

Referring to FIG. 2B, each of the first to x-th data chunks DATA1 to DATAx may include a plurality of bits. In FIG. 2B, DATA1 to DATAx is further denoted as chunks CK1 to CKx, respectively. That is, the first data chunk DATA1 configured of a plurality of bits may be stored as the first chunk CK1, a second data chunk DATA2 configured of a plurality of bits may be stored as the second chunk CK2, and so on.

For a data recovery operation according to the present embodiment, an exclusive OR operation (XOR) on the first to x-th data chunks DATA1 to DATAx may be performed. For example, the exclusive OR operation (XOR) may be performed on D1 data of the first data chunk DATA1 and D2 data of the second data chunk DATA2 to generate parity $P_1 1$, and the exclusive OR operation (XOR) may be performed on the parity $P_1 1$ and D3 data of the third chunk CK3 to generate parity $P_1 2$. A group of parity bits $P_1 M$, $P_2 M$, $P_3 M$, ... $P_N M$ (where, "M" is the sequence of each XOR operation between '1' and 'x−1' and "N" is a number of bits within each data chunk) generated by the $M^{th}$ bitwise XOR operation may be referred to as a subparity. In the present embodiment, the subparity means parity generated before a final XOR operation. In such a method, an individual subparity may be generated by the exclusive OR (XOR) operation which is sequentially performed on the first to the x-th data chunks DATA1 to DATAx, and the final subparity comprised of the group of parity bits $P_1(x-1)$, $P_2(x-1)$, $P_3(x-1)$, ... $P_N(x-1)$ may be stored in a first storage area of the parity group Parity GR. In such a method, final subparity comprised of the group of parity bits $P_1(x-1)$, $P_2(x-1)$, $P_3(x-1)$, ... $P_N(x-1)$ generated by performing a bit-level exclusive OR (XOR) operation on data bits of the data chunks may be sequentially stored in storage areas of the parity group Parity GR. In this disclosure, an XOR operation performed on a current data chunk to generate a current subparity may be a chunk-level XOR operation performed bitwise between the current data chunk and a previous subparity. The chunk-level XOR operation may include N bit-level XOR operations performed on the respective data bits within each data chunk to respectively generate the N parity bits $P_1 M$, $P_2 M$, $P_3 M$, ... $P_N M$ (e.g., $P_1 1$, $P_1 2$, $P_1 3$, ... $P_1(x-1)$ illustrated in FIG. 2B).

When an error bit EB occurs in the first to x-th chunks CK1 to CKx, the memory controller 200 of FIG. 1 may perform an error correction operation using an error correction code (ECC). However, the error correction operation using the ECC may be performed only when the number of error bits EB generated in each chunk is less than a threshold. When the number of error bits EB is greater than the threshold, a recovery operation 21 described below may be performed.

For example, when error bits EB of the threshold or more occurs in the first chunk CK1, and the D1 data is the error bits, the recovery operation 21 of the D1 data may be performed by performing the exclusive OR (XOR) operation on remaining D2 to Dx data (that is, excluding D1 data) and performing the exclusive OR (XOR) operation on a value generated by the exclusive OR (XOR) operation on the remaining D2 to Dx data and the parity P1 again. That is, a final value obtained by performing the exclusive OR (XOR) operation on the data (excluding the data in which error(s) occur) becomes the D1 data. Since the above-described recovery operation 21 may be performed by the memory controller 200, the memory controller 200 is specifically described as follows.

Referring to FIG. 2C, the memory controller 200 may include a recovery controller 210, a parity module 220, and a parity storage 230. The memory device 100 may include an area in which the data chunks are stored and an area in which the parity is stored.

The parity module 220 may perform an operation for generating a parity bit by using the data chunks DATA1 to DATAx to be stored in the memory device 100. The operation may include various methods, but in the present embodiment, the exclusive OR (XOR) operation is described as an example. The plurality of data chunks DATA1 to DATAx may form a data group (Data Group) for generating parity bits. That is, when the bit-level exclusive OR (XOR) operation is performed on data bits belonging to a specific data group, the parity bit may be generated. Hereinafter, the data group may mean two or more data bits generating one parity bit. For example, when a first parity bit is generated by the first data chunk DATA1 and the second data chunk DATA2, the data group may include first data bit D1 of FIG. 2B of the first data chunk DATA1 and first data bit D2 of FIG. 2B of the second data chunk DATA2. As described above, a group of parity bits $P_1M$ to $P_NM$ generated by the $M^{th}$ chunk-level XOR operation performed bitwise on a $(M+1)^{th}$ data chunks may be a subparity. In such a method, the final subparity comprised of the group of parity bits $P_1(x-1)$ to $P_N(x-1)$ generated through the $(x-1)^{th}$ chunk-level XOR operation performed bitwise on the $x^{th}$ data chunk may become a parity group (Parity GR).

The exclusive OR (XOR) operation and the data recovery method are exemplarily described as follows. The data group may include the first data chunk DATA1 and the second data chunk DATA2. It is assumed that data indicated by the first data chunk DATA1 is "1101 0011". It is assumed that data indicated by the second data chunk DATA2 is "0011 1011". The parity module 220 may perform the exclusive OR (XOR) operation on the first data chunk DATA1 and the second data chunk DATA2. As a result, the parity (Parity) may be generated. Specifically, the parity may be "1110 1000". Thereafter, the first data chunk DATA1 and the second data chunk DATA2 may be stored in the memory device 100. In addition, the parity may be stored in the memory device 100. As a result of performing a read operation on the first data chunk DATA1 stored in the memory device 100, an error may occur. In this case, the second data chunk DATA2 and the parity group may be read, and the exclusive OR (XOR) operation may be performed. That is, when the exclusive OR (XOR) operation is performed on "0011 1011" and "1110 1000", "1101 0011" may be generated. Therefore, the first data chunk DATA1 in which an error occurs may be recovered. In the same method, when the exclusive OR operation is performed repeatedly on the first data chunk to the x-th data chunk DATA1 to DATAx in the data group, the parity corresponding to the data group may be generated.

The parity storage 230 may temporarily store a value generated as a result of the exclusive OR (XOR) operation by the parity module 220. That is, the parity module 220 may generate subparity. When the exclusive OR (XOR) operation in which the subparities are generated by the parity module 220 is repeated and the number of times the exclusive OR (XOR) operation is performed reaches a threshold number of times, the parity to be stored in the memory device may be determined.

The subparity may be a value generated before the exclusive OR operation is completed with respect to all data chunks DATA1 to DATAx in the data group. That is, whenever the exclusive OR (XOR) operation is performed once on a data chunk, one subparity may be generated. In addition, when the exclusive OR (XOR) operation on all data chunks DATA1 to DATAx in the data group is completed, the value generated at this time may be determined as the parity to be stored in the memory device. That is, when the exclusive OR (XOR) operation on all data chunks DATA1 to DATAx in the data group is completed, the parity group, which includes all the parities, may be generated in the memory device 100.

The parity storage 230 may temporarily store at least one of the subparity or the parity. The parity storage 230 may store a subparity generated whenever the exclusive OR (XOR) operation is performed. The parity storage 230 may temporarily store all subparities generated until the parity to be stored in the memory device 100 is generated. In another embodiment, whenever the exclusive OR (XOR) operation is performed, the parity storage 230 may store the most recent subparity generated as a result of the most recent XOR operation. The parity storage 230 may be a volatile memory device.

The recovery controller 210 may control operations of the parity module 220 and the parity storage 230. Specifically, the recovery controller 210 may control a time at which the parity generated by the parity module 220 is provided and stored in the memory device. The parity module 220 may perform the exclusive OR (XOR) operation a threshold number of times. The threshold number of times may correspond to the number of data chunks in the data group. When the exclusive OR operation is performed the threshold number of times, that may ensure that the parity to be stored in the memory device is generated. For example, it is assumed that ten data chunks DATA1 to DATA10 are included in one data group. In this case, the threshold number of times may be nine. That is, when nine exclusive OR (XOR) operations are completed, it may be determined exclusive OR (XOR) operations are completed with respect to all ten data chunks DATA1 to DATA10. In addition, parity that is finally generated after the nine exclusive OR (XOR) operations are completed may be the parity to be stored in the memory device.

The parity storage 230 may store at least one of the subparity or the parity. In response to a control signal of the recovery controller 210, the parity stored in the parity storage 230 may be provided to the memory device 100. The memory device 100 may store the received parity in a set area designated for storage of the parity. As described above, even when the data chunks corresponding to the parity are not yet stored in the memory device 100, the parity may be stored in the memory device 100. That is, the parity may be stored in advance of the data to which the parity corresponds.

The threshold number of times may be set to any suitable value based on system specifications and operational requirements. The memory device 100 may have a limited size, which may need to be considered in setting the threshold.

In an embodiment, in a situation in which higher reliability needs to be secured, the number of data chunks included in one data group Data Group may be reduced. That is, the preset threshold number of times for generating one parity may have a reduced value. Accordingly, the number of parities to be stored in the memory device may increase, and a possibility of recovering the data in which an error occurs may increase.

In another embodiment, when it is necessary or desirable to accommodate more data, the area in which the parity is stored may be reduced and the area where data is stored may be increased. Thus, the number of data chunks in one data group may be increased. That is, the threshold number of times for generating one parity may be increased. Accordingly, the number of parities to be stored in the memory device may be reduced, and the area in which the data is to be stored may be further increased.

Figure 3:
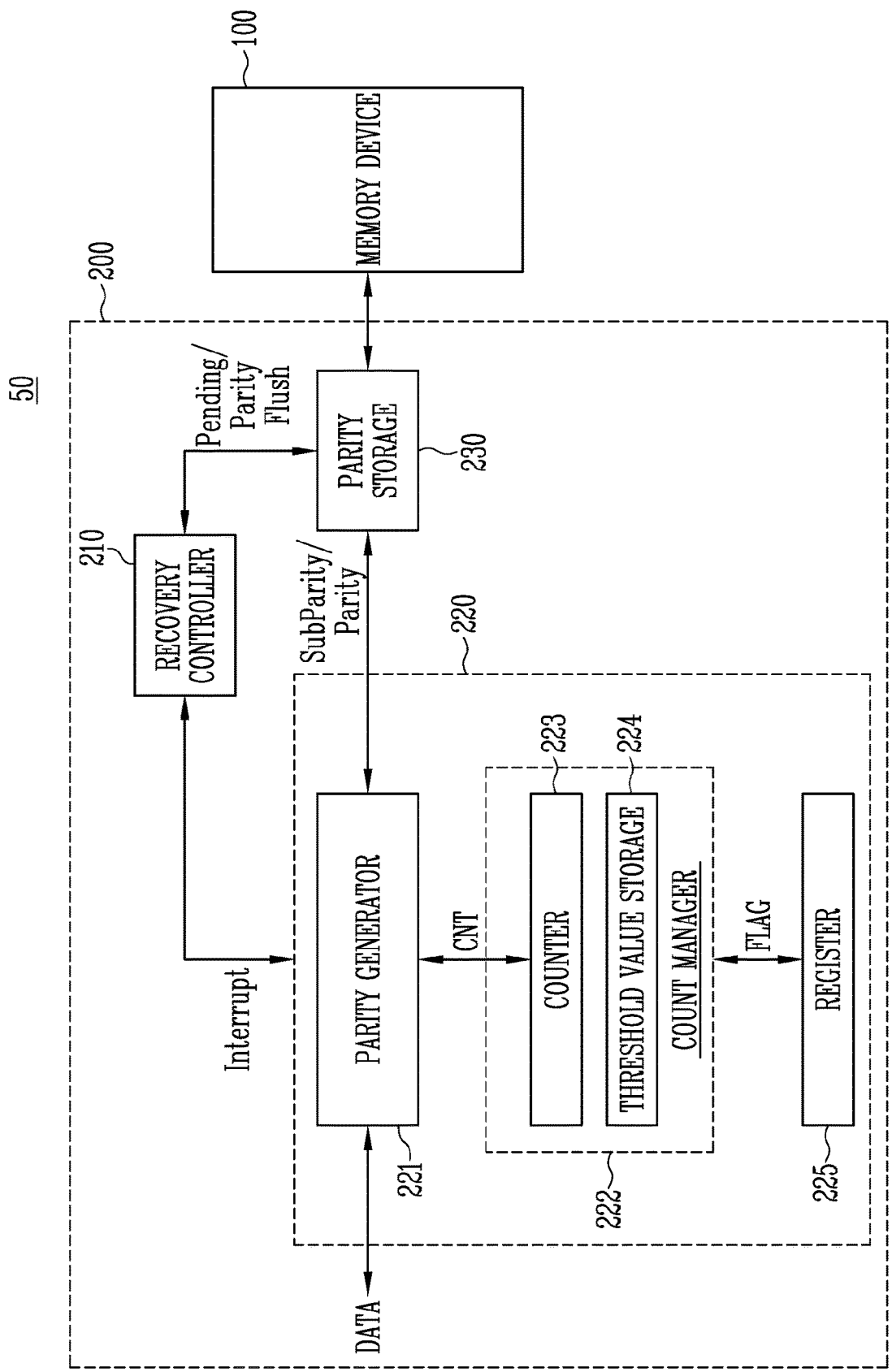
FIG. 3 is a block diagram illustrating a memory controller according to an embodiment.

FIG. 3 is a block diagram illustrating the memory controller according to an embodiment.

Referring to FIG. 3, the memory controller 200 may include the recovery controller 210, the parity module 220, and the parity storage 230. The parity module 220 may include a parity generator 221, a count manager 222, and a register 225. The register 225 is shown as being included in the parity module 220, but the present invention is not limited to that configuration. The register 225 may be disposed externally to the parity module 220. The same is true for the parity storage 230. While it is shown as being included in the memory controller 200, the parity storage 230 may be included within the storage device 50 but externally to the memory controller 200.

In an embodiment, data DATA to be stored in the memory device 100 may be input to the parity generator 221 in units of data chunks. The parity generator 221 may perform the exclusive OR (XOR) operation using the data chunks. The value generated as a result of performing the exclusive OR (XOR) operation of the parity generator 221 may be temporarily stored in the parity storage 230.

The count manager 222 may manage the number of times the exclusive OR (XOR) operation is performed. The count manager 222 may include a counter 223 and a threshold value storage 224. The counter 223 may be initialized to an initial value before the first exclusive OR (XOR) operation is performed. For example, the initial value of the counter 223 may be 0. The threshold storage 224 may store the threshold number of times described with reference to FIG. 2C. The threshold number of times may be changed according to the situation. The threshold number of times may be changed under control of the recovery controller 210 and the changed threshold number may be stored in the threshold value storage 224. In an embodiment, in a step in which power is input to the storage device 50 and a booting operation is performed, the threshold number of times may be determined. Hereinafter, a threshold value may be the same as, or correspond to, the threshold number of times.

Referring to FIG. 3, the parity generator 221 may provide a control signal CNT to the counter 223 as the exclusive OR (XOR) operation is completed. The counter 223 may count the number of times the exclusive OR (XOR) operation is performed using the control signal CNT. The count manager 222 may compare the number of times the exclusive OR (XOR) operation is performed with the threshold stored the threshold value storage 224.

In an embodiment, the register 225 may indicate whether the number of times the exclusive OR (XOR) operation is performed is equal to the threshold number of times. That is, the register 225 may include a flag FLAG indicating whether the number of times the exclusive OR (XOR) operation is performed is equal to the threshold number of times. For example, the flag FLAG may have multiple states, e.g., 0 and 1. One of these two states, e.g., 0, may indicate that the exclusive OR (XOR) operation has not been performed the threshold number of times. The other state, e.g., 1, may indicate that the number of times the exclusive OR (XOR) operation has been performed has reached the threshold number of times. Using a flag to indicate whether or not the XOR operation has been performed the threshold number of times is merely one example. Such indication may be implemented by various other methods.

Assume that the number of times the exclusive OR (XOR) operation has been performed has not reached the threshold number of times. For example, 0 may be stored in the register 225. At this time, the value stored in the parity storage 230 may be the subparity. The recovery controller 210 may perform pending on the subparity stored in the parity storage 230 and control the parity module 220 to perform a next exclusive OR (XOR) operation using the subparity. The parity generator 221 may perform the exclusive OR (XOR) operation again using the next data chunk, which results in the number of times the XOR operation has been performed being incremented. When the control signal CNT is provided to the counter 223 after the exclusive OR (XOR) operation is performed again, the counter 223 may compare the incremented number of times with the threshold value. In the method described above, the count manager 222 may accumulate the number of times the exclusive OR operation is performed until the number of the times the exclusive OR operation has been performed reaches the threshold number of times.

Assume that the number of times the exclusive OR (XOR) operation has been performed has reached the threshold number of times. The count manager 222 may compare the accumulated number of times the exclusive OR (XOR) operation has been performed with the threshold number of times, and store information indicative of the result of that comparison in the register 225. For example, 1 may be stored in the register 225. At this time, the value stored in the parity storage 230 may be the parity. In an embodiment, the recovery controller 210 may periodically perform an operation of checking the register 225. When the recovery controller 210 obtains 1 as a result of checking the value stored in the register 225, the recovery controller 210 may output a parity flush signal (Parity Flush). The parity storage 230 may provide the parity stored in the parity storage 230 to the memory device 100 in response to the parity flush signal. The recovery controller 210 may perform a reset operation after the parity is provided to the memory device 100. The reset operation may include erasing data stored in the parity storage 230 and initializing a value of the counter 223. When the value of the counter 223 is initialized, the value may be 0. The memory device 100 may store the parity. That is, when the number of times the exclusive OR (XOR) operation has been performed reaches the threshold number, the parity may be stored in the memory device 100. Since data chunks and the parity are stored in different areas within the memory device 100, the parity may be first stored in the memory device 100 before the data chunks are stored in the memory device 100. A size of the data chunks may be relatively larger than a size of the parity. Therefore, a time required for the data chunks to be stored in the memory device 100 is longer than a time required for the parity to be stored in the memory device 100. In an embodiment, the parity may be stored in the memory device 100 without waiting for the data chunks to be stored in the memory device 100. The parity according to an embodiment may be stored in the memory device 100 faster and sooner than when the parity is stored after storage of the data chunks in the memory device 100 is completed.

In another embodiment, it is assumed that the number of times the exclusive OR (XOR) operation has been performed has reached the threshold number of times. The register 225 may include 1. The parity module 220 may sense that the register value has changed to 1 and may generate an interrupt signal (Interrupt). The interrupt signal may be provided to the recovery controller 210. The recovery controller 210 may control the parity storage 230 to store the parity stored in the parity storage 230 in the memory device 100, in response to the interrupt signal. The recovery controller 210 may provide the parity flush signal (Parity Flush) to the parity storage 230. The parity may be provided to the memory device 100 in response to the parity flush signal, and the memory device 100 may store the received parity in the parity area. Similarly, the recovery controller 210 may perform an initialization operation after the parity is provided to the memory device 100.

Figure 4:
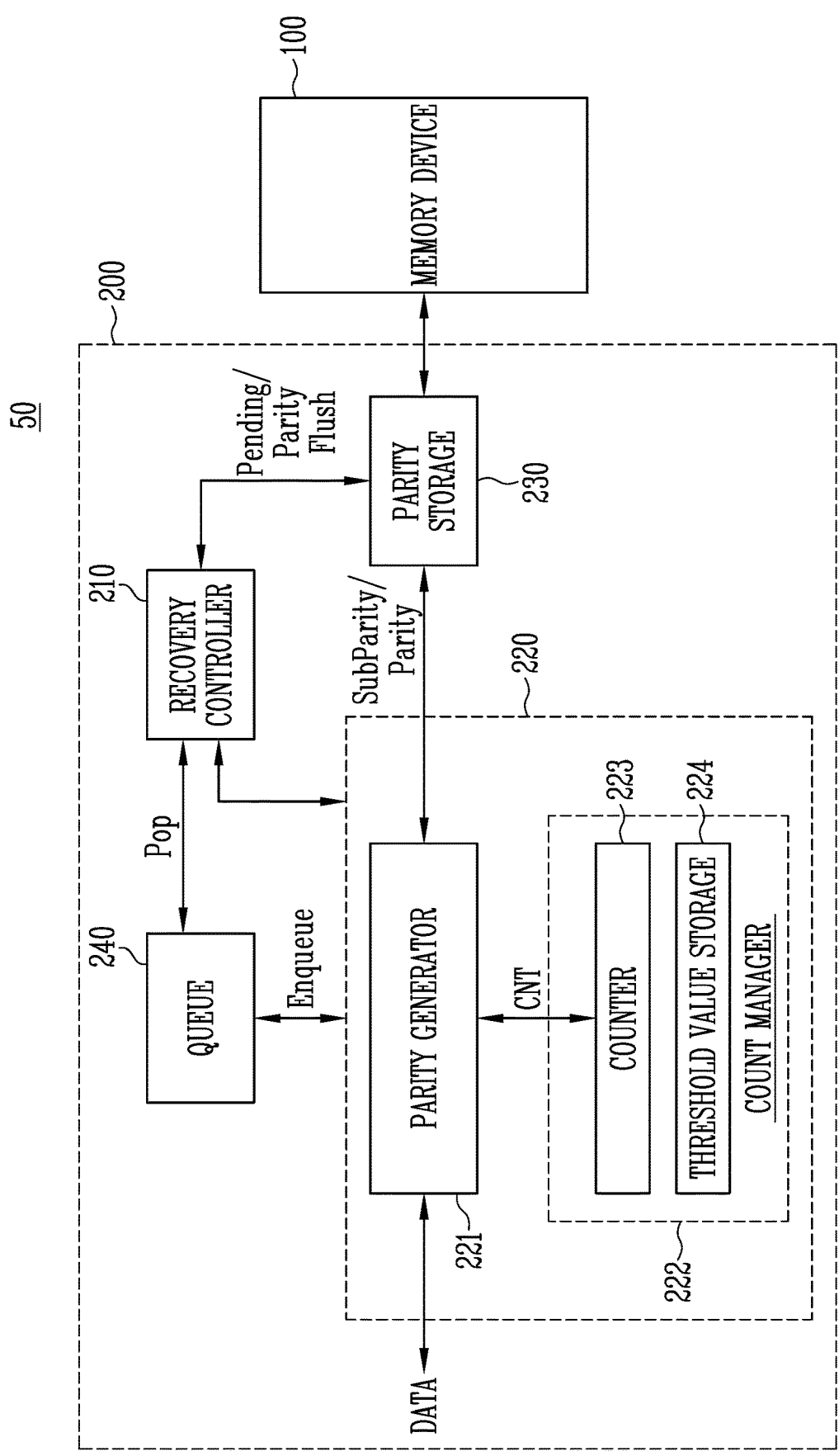
FIG. 4 is a block diagram illustrating the memory controller according to another embodiment.

FIG. 4 is a block diagram illustrating the memory controller according to another embodiment.

Referring to FIG. 4, the memory controller 200 may include the recovery controller 210, the parity module 220, the parity storage 230, and a queue 240. The queue 240 may be a data structure shared by the recovery controller 210 and the parity module 220. The parity module 220 may include the parity generator 221 and the count manager 222. The parity storage 230 is shown as being included in the memory controller 200, but may be disposed externally to the memory controller 200 but within the storage device 50. Since the parity generator 221, the count manager 222, and the parity storage 230 are the same as, or correspond to, those described with reference to FIG. 3, FIG. 4 is primarily described in terms of its differences with that disclosed in FIG. 3.

The data chunk may be input to the parity generator 221, and the exclusive OR (XOR) operation may be performed. The number of times the exclusive OR (XOR) operations are performed may be accumulatively managed by the count manager 222. That is, the count manager 222 may maintain a count of the XOR operations, which count is incremented each time such operation is performed. The count manager 222 may determine whether the accumulated number of exclusive logical OR (XOR) operations that have been performed is the same as the threshold number of times stored in the threshold storage 224.

Assume that the number of times the exclusive OR (XOR) operation has been performed has not reached the threshold number of times. The parity module 220 may enqueue information indicating that that state in the queue 240. For example, 0 may be added to the queue 240. The recovery controller 210 may obtain (pop) 0 from the queue 240. The recovery controller 210 may control the parity module 220 to perform the exclusive OR (XOR) operation again using a next data chunk. The recovery controller 210 may perform pending on the subparity stored in the parity storage 230 and control the parity module 220 to perform a next exclusive OR (XOR) operation using the subparity. The parity generator 221 may perform the exclusive OR (XOR) operation again using the next data chunk.

Assume that the number of times the exclusive OR (XOR) operation has been performed has reached the threshold number of times. The parity module 220 may enqueue information indicating that state to the queue 240. For example, 1 may be added to the queue 240. The recovery controller 210 may obtain (pop) 1 from the queue 240. The recovery controller 210 may output the parity flush signal (Parity Flush) to the parity storage 230. The parity storage 230 may provide the parity stored in the parity storage 230 to the memory device 100 in response to the parity flush signal. The memory device 100 may store the parity. That is, when the number of times the exclusive OR (XOR) operation has been performed has reached the threshold number of times, the parity may be stored in the memory device 100. Similarly, the recovery controller 210 may perform an initialization operation after the parity is provided to the memory device 100. The data stored in the parity storage 230 may be erased and the value of the counter 223 may be initialized through the initialization operation. When the value of the counter 223 is initialized, the value may be 0.

Figure 5:
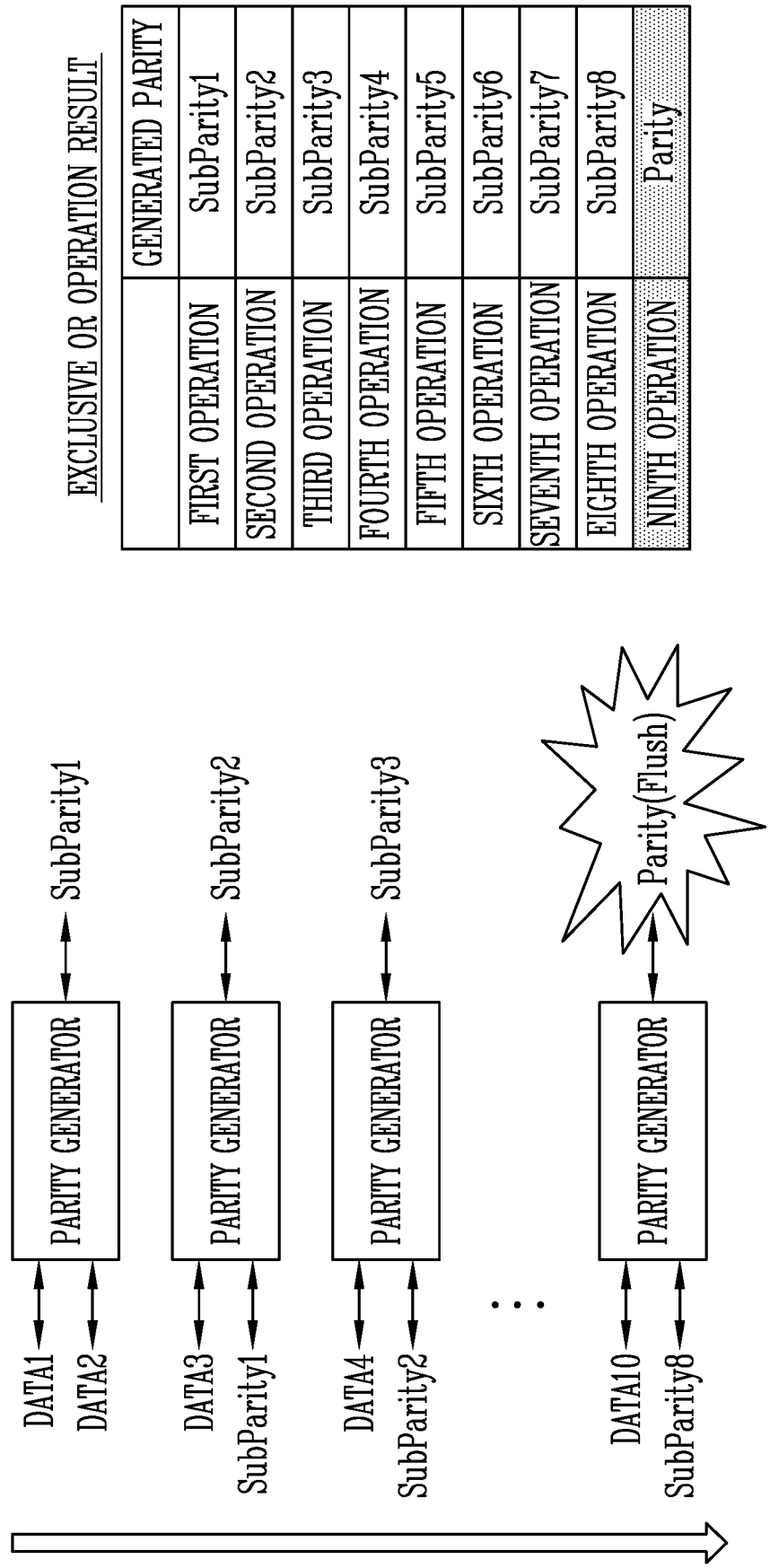
FIG. 5 is a diagram illustrating an operation of generating parity according to an embodiment.

FIG. 5 is a diagram for describing an operation of generating the parity according to an embodiment.

Referring to FIG. 5, the parity generator may perform the exclusive OR (XOR) operation. The specific operation method may be the same as the method described with reference to FIG. 2B.

Referring to FIG. 5, the threshold number of times may be nine. That is, as an example, as a result of performing the exclusive OR operation on a total of 10 data chunks DATA1 to DATA10, the parity to be stored in the memory device may be generated.

Specifically, the first data chunk DATA1 and the second data chunk DATA2 may be input to the parity generator. As a result of the exclusive OR (XOR) operation performed by the parity generator, first sub parity (SubParity1) may be generated. The generated SubParity1 may be temporarily stored in the parity storage. Since that is the first XOR operation, the number XOR operations performed is less than nine, which are the threshold number of times, a next XOR operation may be performed.

The third data chunk DATA3 and SubParity1 may be input to the parity generator. As a result of the exclusive OR (XOR) operation of the parity generator, the second sub parity (SubParity2) may be generated. The generated SubParity2 may be temporarily stored in the parity storage. At this time, the parity storage may maintain SubParity1 and may further include SubParity2. Alternatively, data stored in the parity storage may be updated to store SubParity2 which replaces SubParity1. The next XOR operation may be performed, since the threshold has not yet been reached.

The fourth data chunk DATA4 and SubParity2 may be input to the parity generator to generate a third sub parity (SubParity3). This process continues. That is, eight exclusive OR (XOR) operations are performed in the same method.

Finally, the tenth data chunk DATA10 and eighth sub parity (SubParity8) may be input to the parity generator. Subparity8 may be a value generated as a result of an eighth exclusive OR (XOR) operation performed immediately before. The parity generator may generate the parity (Parity) as a result of the operation of a ninth exclusive OR (XOR) operation. Since the number of times the exclusive OR (XOR) operations has been performed has reached nine which is the threshold number of times, the parity generated as a result of the operation may be determined as a value to be stored in the memory device. Next, a flush operation in which the parity, which is stored in the parity storage, is stored in the memory device may be performed.

According to an embodiment, regardless of completion of storage of the first data chunk to the tenth data chunks DATA1 to DATA10 in the memory device, the parity that is already generated may be stored in the memory device. That is, before DATA1 to DATA10 are stored in the memory device, the parity may be stored in the memory device. That is, the parity is stored in the memory device in advance of the associated data. Therefore, operation efficiency of the storage device and reliability of data may be improved.

Figure 6:
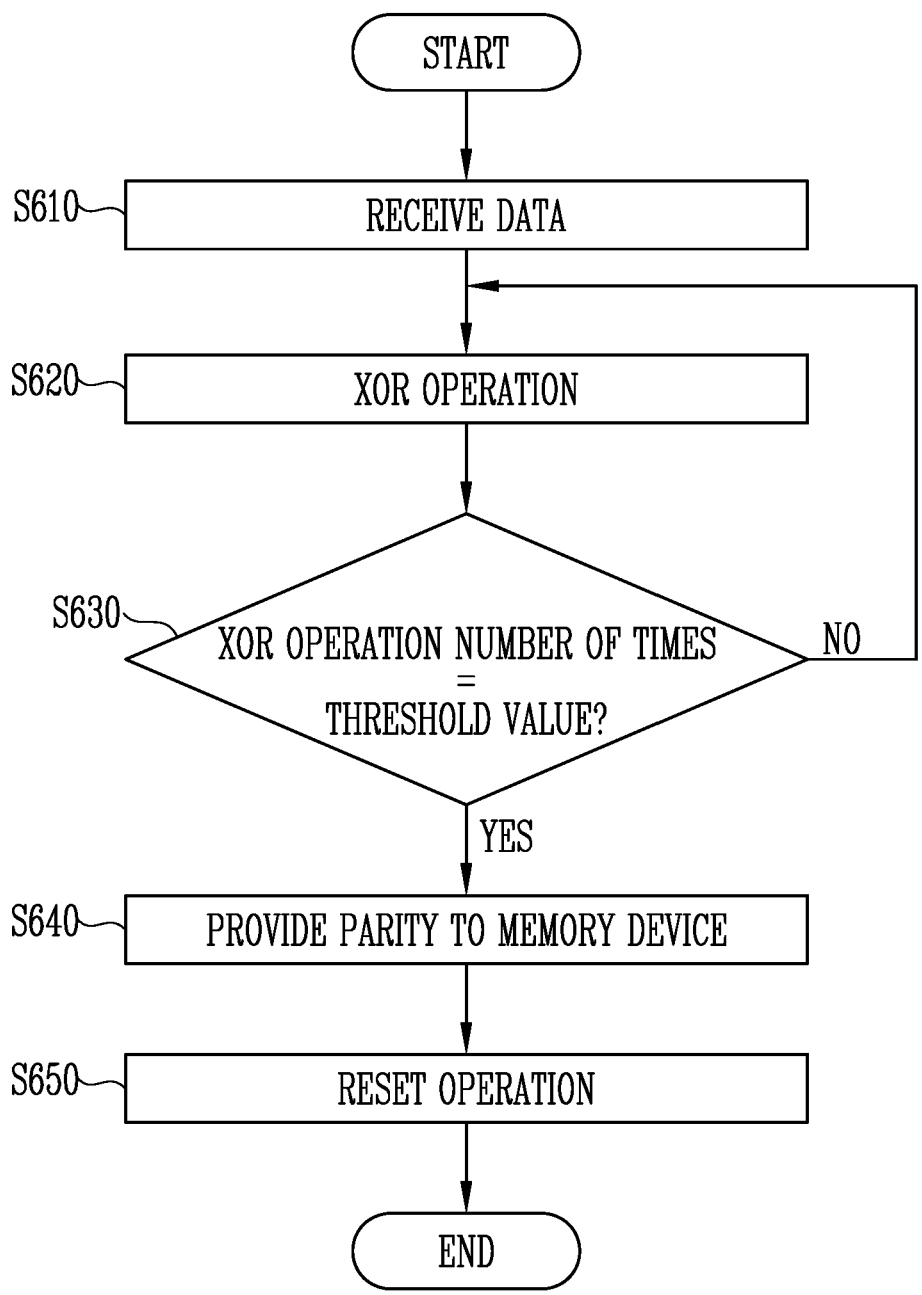
FIG. 6 is a flowchart illustrating a method of operating a memory controller according to an embodiment.

FIG. 6 is a flowchart illustrating a method of operating the memory controller according to an embodiment.

Referring to FIG. 6, in operation S610, data may be received by the memory controller in units of data chunks. That is, the data may be grouped in a plurality of data chunks. A data chunk may mean an amount of data on which an exclusive OR operation is performed.

In operation S620, a sequence of exclusive OR (XOR) operations may be performed using the data chunks. The data chunks may be input to the parity module in the memory controller. The parity module performs the exclusive OR operations, and as a result, the subparity (SubParity) may be generated.

In operation S630, the number of times the exclusive OR (XOR) operation has been performed may be determined and that number compared to a threshold number of times, which may be set in advance. When the number of times the XOR operation has been performed is less than (not equal to) the threshold number of times, the process may return to operation S620. In this case, the subparity and the data chunk may be input to the parity module, and the exclusive OR (XOR) operations may be performed again. On the other hand, when the number of times the XOR operation has been performed is equal to the threshold number of times, the process may proceed to operation S640.

In operation S640, the parity generated as a result of the operations may be provided to the memory device. The memory device may store the parity in the parity area. The parity may be stored in the memory device regardless of whether the data chunks are stored in the memory device. In an embodiment, the parity may be stored in the memory device before storage of the data chunks in the memory device is completed.

In operation S650, the reset operation of initializing the parity storage and the counter in the parity module may be performed. The parity storage may temporarily store at least one of the subparity or the parity. The data stored in the parity storage may be erased by the reset operation. The value stored in the counter may be initialized by the reset operation.

Figure 7:
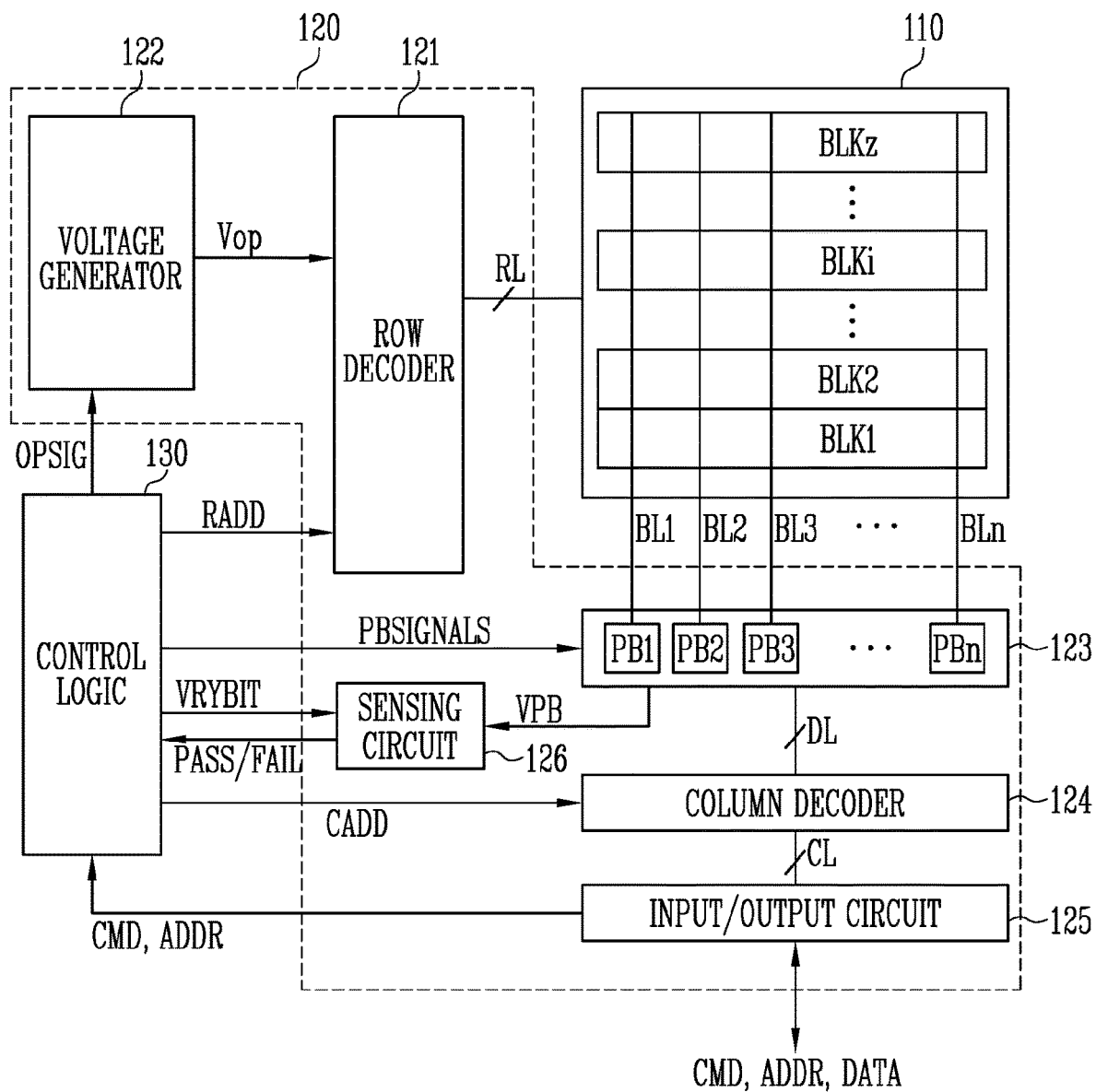
FIG. 7 is a diagram illustrating a memory device according to an embodiment of the present disclosure.

FIG. 7 is a diagram illustrating the memory device 100 according to an embodiment of the present disclosure.

Referring to FIG. 7, the memory device may include a memory cell array 110, a peripheral circuit 120 and control logic 130.

The memory cell array 110 includes a plurality of memory blocks BLK1 to BLKz, which are connected to an address decoder 121 through row lines RL. The memory blocks BLK1 to BLKz may be connected to a page buffer group 123 through bit lines BL1 to BLn. Each of the plurality of memory blocks BLK1 to BLKz includes a plurality of memory cells. In an embodiment, the plurality of memory cells are non-volatile memory cells. Memory cells connected to the same word line may be defined as one page. That is, the memory cell array 110 is configured of a plurality of physical pages. Thus, one memory block may include a plurality of pages.

Each of the memory cells included in the memory cell array 110 may be configured as a single level cell (SLC) storing one data bit, a multi-level cell (MLC) storing two data bits, a triple level cell (TLC) storing three data bits, or a quad level cell (QLC) storing four data bits.

The peripheral circuit 120 may be configured to perform a program operation, a read operation, or an erase operation on a selected area of the memory cell array 110 under control of the control logic 130. The peripheral circuit 120 may drive the memory cell array 110. For example, the peripheral circuit 120 may apply various operation voltages to the row lines RL and the bit lines BL1 to BLn or discharge the applied voltages under the control of the control logic 130.

The peripheral circuit 120 may include the address decoder 121, a voltage generator 122, the page buffer group 123, a column decoder 124, an input/output circuit 125, and a sensing circuit 126.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include at least one source select line, a plurality of word lines, and at least one drain select line. In an embodiment, the word lines may include normal word lines and dummy word lines. The row lines RL may further include a pipe select line.

The address decoder 121 is configured to operate in response to the control of the control logic 130. The address decoder 121 receives a row address RADD from the control logic 130.

The address decoder 121 is configured to decode the row address RADD. The address decoder 121 selects at least one memory block among the memory blocks BLK1 to BLKz according to a decoded address. In addition, the address decoder 121 may select at least one word line of the selected memory block and apply voltages generated by the voltage generator 122 to the selected word line(s) WL according to the decoded address.

For example, during a program operation, the address decoder 121 may apply a program voltage to a selected word line and apply a program pass voltage lower than the program voltage to unselected word lines. During a program verify operation, the address decoder 121 may apply a verify voltage to the selected word line and apply a verify pass voltage higher than the verify voltage to the unselected word lines. During the read operation, the address decoder 121 may apply a read voltage to the selected word line and apply a read pass voltage higher than the read voltage to the unselected word lines.

In an embodiment, an erase operation is performed in a memory block unit. During the erase operation, the address decoder 121 may select one memory block according to the decoded address. During the erase operation, the address decoder 121 may apply a ground voltage to word lines connected to the selected memory block.

The voltage generator 122 operates in response to the control of the control logic 130. The voltage generator 122 is configured to generate a plurality of voltages using an external power voltage supplied to the memory device. Specifically, the voltage generator 122 may generate various operation voltages Vop used in the program, read, and erase operations in response to operation signal OPSIG. For example, the voltage generator 122 may generate a program voltage, a verify voltage, a pass voltage, a read voltage, an erase voltage, and the like in response to the control of the control logic 130.

In an embodiment, the voltage generator 122 may generate an internal power voltage by regulating an external power voltage. The internal power voltage generated by the voltage generator 122 is used as an operation voltage of the memory device 100.

In an embodiment, the voltage generator 122 may generate a plurality of voltages using an external power voltage or an internal power voltage.

For example, the voltage generator 122 may include a plurality of pumping capacitors that receive the internal power voltage, and selectively activate the plurality of pumping capacitors in response to the control of the control logic 130 to generate the plurality of voltages.

The generated plurality of voltages may be supplied to the memory cell array 110 by the address decoder 121.

The buffer group 123 includes first to n-th page buffers PB1 to PBn, which are connected to the memory cell array 110 through the first to n-th bit lines BL1 to BLn, respectively. The first to n-th page buffers PB1 to PBn operate under the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage of a current of the bit lines BL1 to BLn during the read or verify operation.

Specifically, during a program operation, when a program pulse is applied to the selected word line, the first to n-th page buffers PB1 to PBn may transfer data DATA, which is received through the data input/output circuit 125, to selected memory cells through the first to n-th bit lines BL1 to BLn. The memory cells of the selected page are programmed according to the transferred data DATA. A memory cell connected to a bit line to which a program permission voltage (for example, the ground voltage) is applied may have an increased threshold voltage. A threshold voltage of a memory cell connected to a bit line to which a program prohibition voltage (for example, the power voltage) is applied may be maintained. During the program verify operation, the first to n-th page buffers PB1 to PBn read page data from the selected memory cells through the first to n-th bit lines BL1 to BLn.

During a read operation, the first to n-th page buffers PB1 to PBn read the data DATA from the memory cells of a selected page through the first to n-th bit lines BL1 to BLn, and output the read data DATA to the data input/output circuit 125 under control of the column decoder 124.

During an erase operation, the first to n-th page buffers PB1 to PBn may float the first to n-th bit lines BL1 to BLn.

The column decoder 124 may transfer data between the input/output circuit 125 and the page buffer group 123 in response to the column address CADD. For example, the column decoder 124 may exchange data with the first to n-th page buffers PB1 to PBn through data lines DL or may exchange data with the input/output circuit 125 through column lines CL.

The input/output circuit 125 may transfer the command CMD and the address ADDR received from the memory controller 200 described with reference to FIG. 1 to the control logic 130, or may exchange the data DATA with the column decoder 124.

The sensing circuit 126 may generate a reference current in response to a permission bit signal VRYBIT during the read operation or the verify operation, and may compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the permission bit VRYBIT in response to the command CMD and the address ADDR to control the peripheral circuits 120. In addition, the control logic 130 may determine whether the verify operation passed or failed in response to the pass or fail signal PASS or FAIL.

Figure 8:
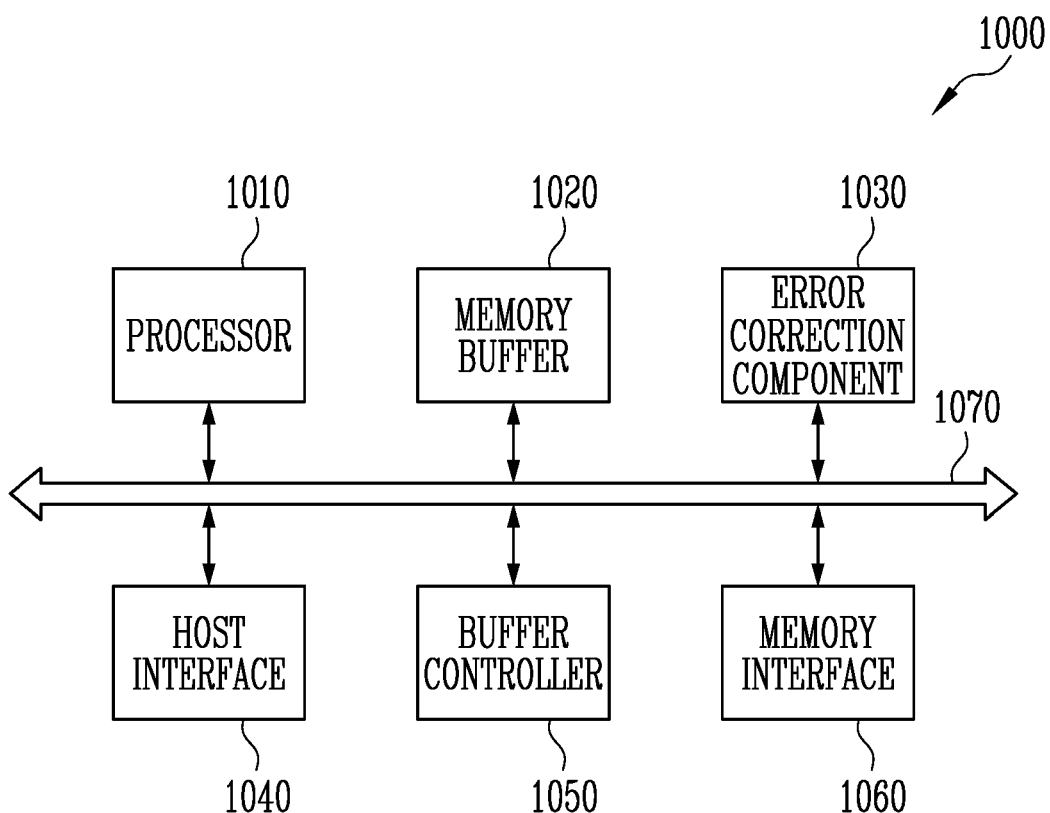
FIG. 8 is a diagram illustrating another embodiment of a memory controller, such as that of FIG. 1.

FIG. 8 is a diagram illustrating another embodiment of the memory controller of FIG. 1.

The memory controller 1000 is connected to a host (not shown) and the memory device. The memory controller 1000 is configured to access the memory device in response to the request from the host.

Referring to FIG. 8, the memory controller 1000 may include a processor 1010, a memory buffer 1020, an error correction component (ECC) 1030, a host interface 1040, a buffer controller 1050, a memory interface 1060, and a bus 1070.

The bus 1070 may be configured to provide a channel between components of the memory controller 1000.

The processor 1010 may control overall operation of the memory controller 1000 and may perform a logical operation. The processor 1010 may communicate with the host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 is configured to randomize data received from the host. For example, the processor 1010 may randomize the data received from the host using a random seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-random seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with the host under control of the processor 1010. The host interface 1040 may be configured to perform communication using at least one of various communication methods/protocols such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and/or a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050. Either or both of these components may be provided separately, or the functionality of either or both components may be distributed to one or more other components in the memory controller 100.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other so as not interfere with, nor affect, each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1020, and the memory interface 1060.

Figure 9:
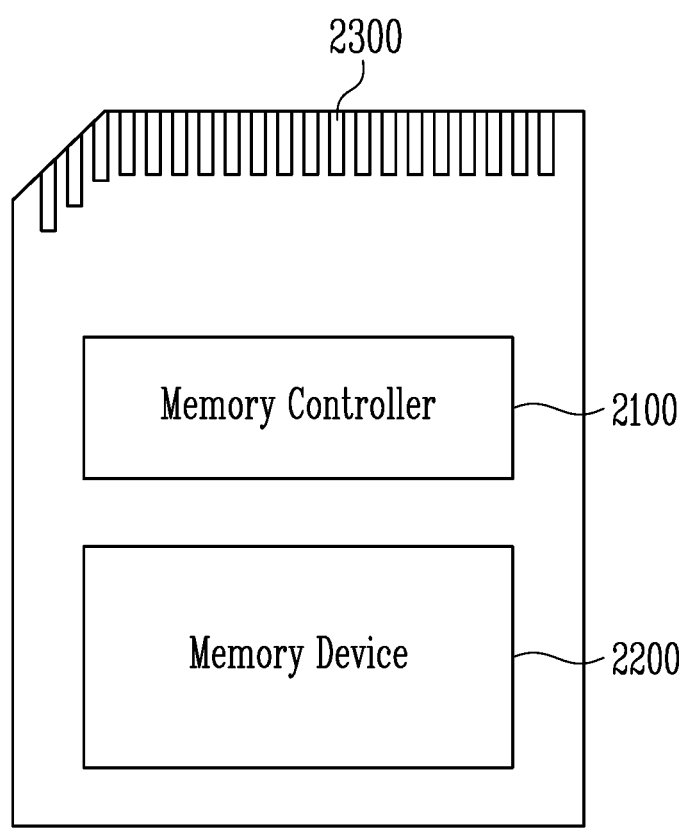
FIG. 9 is a block diagram illustrating a memory card system to which the storage device including the memory device is applied according to an embodiment of the present disclosure.

FIG. 9 is a block diagram illustrating a memory card system to which the storage device including the memory device is applied according to an embodiment of the present disclosure.

Referring to FIG. 9, the memory card system 2000 includes a memory controller 2100, a memory device 2200, and a connector 2300.

The memory controller 2100 is connected to the memory device 2200. The memory controller 2100 is configured to access the memory device 2200. The memory controller 2100 may be implemented with the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and/or an NVMe. For example, the connector 2300 may be defined by at least one of the various communication standards described above.

For example, the memory device 2200 may be implemented as any of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin-torque magnetic RAM (STT-MRAM).

For example, the memory controller 2100 or the memory device 2200 may be packaged and provided as one semiconductor package in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline (SOIC), a shrink small outline package (SSOP), a thin small outline (TSOP), a system in package (SIP), a multi-chip package (MCP), a wafer-level fabricated package (WFP), or a wafer-level processed stack package (WSP). Alternatively, the memory device 2200 may include a plurality of non-volatile memory chips, which may be packaged and provided as one semiconductor package based on any of the above-described package methods.

For example, the memory controller 2100 and the memory device 2200 may be integrated into one semiconductor device. For example, the memory controller 2100 and the memory device 2200 may be integrated into one semiconductor device to configure a solid state drive (SSD). In another embodiment, the memory controller 2100 and the memory device 2200 may be integrated into one semiconductor device to configure a memory card, such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and/or a universal flash storage (UFS).

For example, the memory device 2200 may be the memory device 100 described with reference to FIG. 1.

Figure 10:
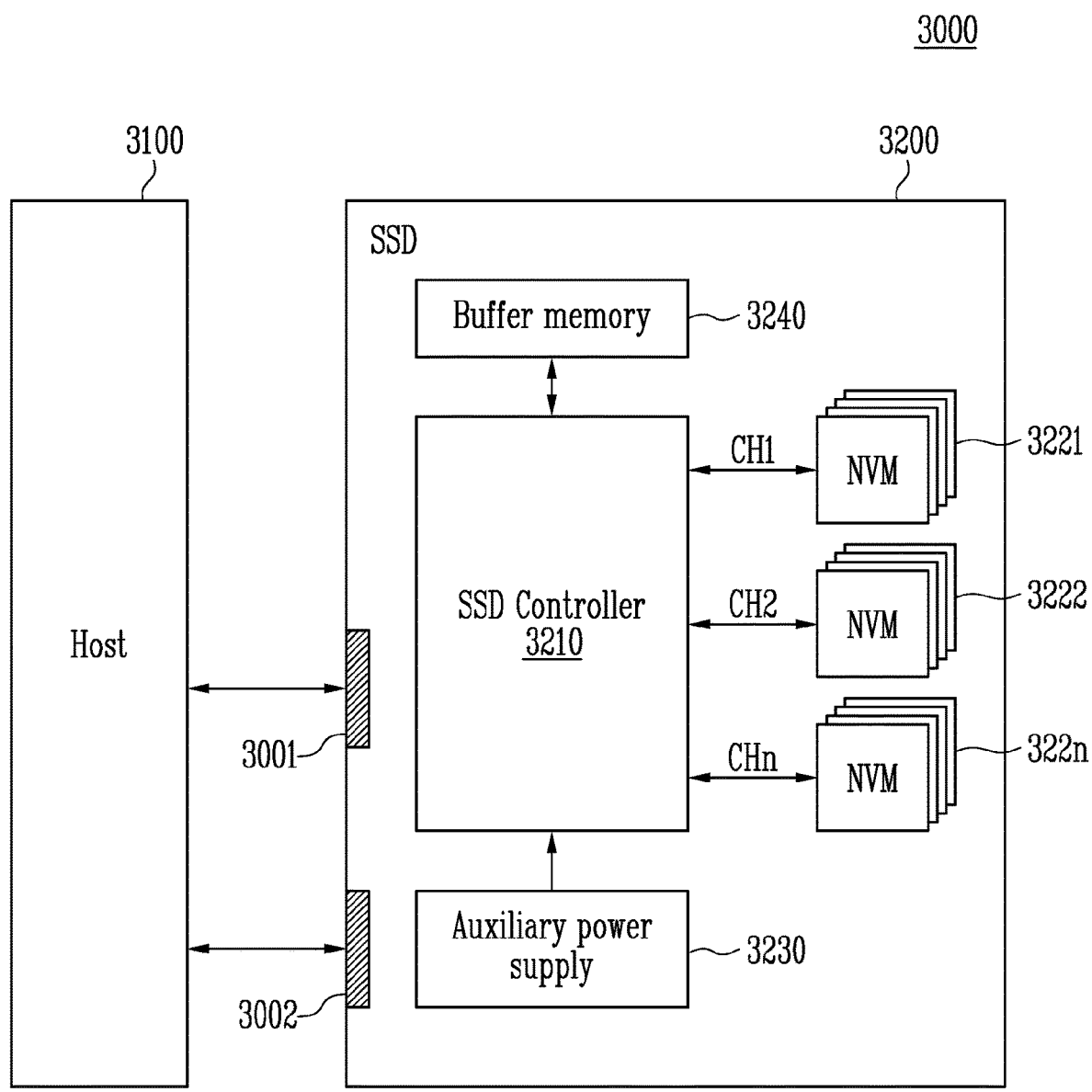
FIG. 10 is a block diagram illustrating a solid state drive (SSD) system to which the storage device including the memory device is applied according to an embodiment of the present disclosure.

FIG. 10 is a block diagram illustrating a solid state drive (SSD) system to which the storage device including the memory device is applied according to an embodiment of the present disclosure.

Referring to FIG. 10, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

In an embodiment, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and/or an NVMe.

The auxiliary power device 3230 is connected to the host 3100 through the power connector 3002. The auxiliary power device 3230 may receive the power PWR from the host 3100 and may store the power. The auxiliary power device 3230 may provide the SSD 3200 with power when the supply of power from the host 3100 is not smooth. For example, the auxiliary power device 3230 may be disposed in or externally to the SSD 3200. For example, the auxiliary power device 3230 may be disposed on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

For example, the non-volatile memories 3321 to 322n may be the memory device 100 described with reference to FIG. 2C.

Figure 11:
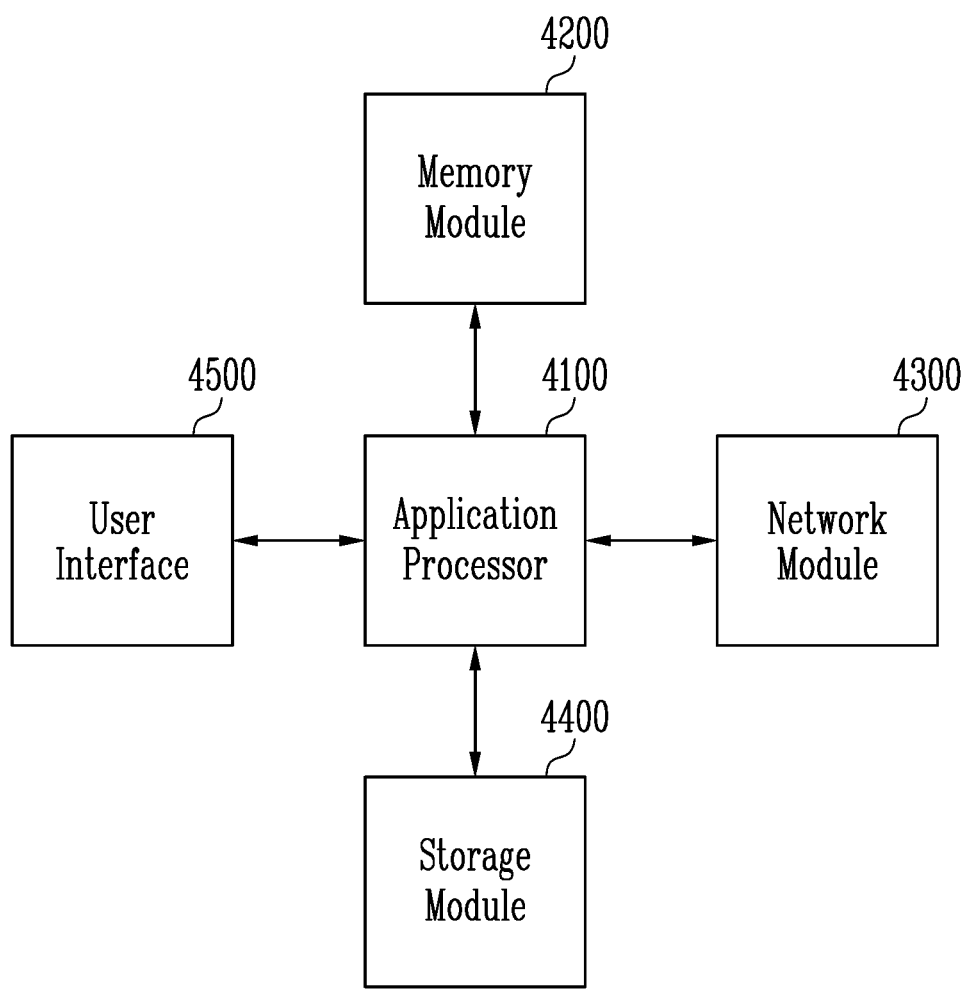
FIG. 11 is a block diagram illustrating a user system to which the storage device including the memory device is applied according to an embodiment of the present disclosure.

FIG. 11 is a block diagram illustrating a user system to which the storage device including the memory device is applied according to an embodiment of the present disclosure.

Referring to FIG. 11, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, each of which may be configured the same as the memory device 100 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, and a speaker.

While the present invention has been illustrated and described in connection with specific embodiments, various modifications may be made within the scope of the disclosure, as those skilled in the art will understand. The present invention encompasses all such modifications that fall within the scope of the claims.

What is claimed is:

1. A memory controller that controls an operation of a memory device, the memory controller comprising:
   a parity module configured to perform one or more exclusive OR operations using data to be stored in the memory device and generate parity according to the one or more exclusive OR operations; and
   a recovery controller configured to control the parity module to store the parity in the memory device based on the number of times the exclusive OR operation is performed,
   wherein the recovery controller receives from the parity module an interrupt signal indicating that the number of times the exclusive OR operations that have been performed has reached a threshold value.

2. The memory controller of claim 1, wherein the recovery controller controls the parity module to perform the exclusive OR operation until the number of times the exclusive OR operation has been performed reaches the threshold value.

3. The memory controller of claim 1, wherein the recovery controller controls the parity module to store the parity in the memory device when the number of times the exclusive OR operation has been performed reaches the threshold value.

4. The memory controller of claim 1, wherein the parity module comprises:
   an operation circuit configured to perform the one or more exclusive OR operations;
   a count manager configured to determine whether the number of times the exclusive OR operations have been performed is equal to the threshold value; and
   a register including a value indicating whether the number of times the exclusive OR operations have been performed has reached the threshold value.

5. The memory controller of claim 4, wherein the recovery controller obtains the value included in the register and controls the parity module to store the parity in the memory device based on the value.

6. The memory controller of claim 1, further comprising: a parity storage configured to temporarily store the parity generated as a result of performing the one or more exclusive OR operations.

7. The memory controller of claim 6, wherein the recovery controller controls the parity storage to provide the parity included in the parity storage to the memory device.

8. The memory controller of claim 6,
   further comprising: a queue shared by the recovery controller and the parity module,
   wherein the parity module adds information to the queue indicating that the number of times the exclusive OR operation that have been performed has reached the threshold value, and wherein the recovery controller obtains the information from the queue and controls the parity storage to provide the parity included in the parity storage to the memory device.

9. The memory controller of claim 1, wherein the parity includes information used to recover the data when an error occurs as a result of reading the data.

10. A memory controller that controls an operation of a memory device, the memory controller comprising:
a parity module configured to perform an exclusive OR operation a threshold number of times using data to be stored in the memory device, and to generate parity according to the exclusive OR operations; and
a recovery controller configured to control the parity module to store the parity in the memory device before storage of the data is completed,
wherein the recovery controller receives from the parity module an interrupt signal indicating that the number of exclusive OR operations that have been performed has reached a threshold value.

11. The memory controller of claim 10, wherein the parity module comprises:
an operation circuit configured to perform the exclusive OR operation;
a counter configured to count the number of times the exclusive OR operation is performed; and
a threshold value storage configured to store the threshold number of times, which determines a time at which the parity is provided to the memory device.

12. The memory controller of claim 11,
wherein the parity module provides to the recover controller a signal indicating that the number of times the exclusive OR operation has been performed as counted by the counter is equal to the threshold number of times, and
wherein the recovery controller controls the parity module to store the parity in the memory device in response to the signal.

13. The memory controller of claim 11,
wherein the memory controller further comprises a parity storage configured to temporarily store the parity, and
wherein the recovery controller resets the counter and the parity storage as the parity is provided to the memory device.

14. The memory controller of claim 10, wherein the parity includes information used to recover the data when an error occurs as a result of reading the data.

15. A storage device comprising:
a memory device including a plurality of memory cells; and
a memory controller configured to perform an exclusive OR operation at least once using data to be stored in the memory device, and provide parity generated according to the exclusive OR operation to the memory device based on the number of times the exclusive OR operation has been performed,
wherein the memory controller controls the memory device to store the parity, in response to an interrupt signal indicating that the number of exclusive OR operations that have been performed has reached a threshold value.

16. The storage device of claim 15,
wherein the memory device includes a plurality of memory chips in which the data is stored and a memory chip in which the parity is stored, and
wherein the memory chip stores the parity as the number of times the exclusive OR operation is performed reaches the threshold value.

17. The storage device of claim 16, wherein the parity includes information used to recover the data when an error occurs as a result of reading the data.

18. The storage device of claim 16, wherein the data in the memory cells included in the memory chips are divided into a plurality of chunks.

19. The storage device of claim 18, wherein the memory controller generates a final value, obtained by performing the exclusive OR operation on each of the chunks of data, as the parity, and stores the generated parity in a selected memory chip.

20. The storage device of claim 18, wherein, when a chunk in which the number of error bits is greater than a threshold is detected among the plurality of chunks, the memory controller performs the exclusive OR operation on data read from remaining chunks and the parity, and recovers the error bits of the detected chunk using a result of the exclusive OR operation.

* * * * *